Inventors:
Takaaki Yamamoto,
Yutaka Nakamura
Tomio Nagashima
By Ernest G. Montague
Attorney INVENTORS
Takaaki Yamamoto
Yutaka Nakamura
Tomio Nagashima
BY Ernest G. Montague
Attorney

United States Patent Office 3,125,472

Patented Mar. 17, 1964

3,125,472
PROCESS FOR THE PRODUCTION OF MAGNETIC MATERIALS BY THE UTILIZATION OF MAGNETIC ANNEALING EFFECT

Takaaki Yamamoto, 6643 Kugenuma, Fujisawa-city, Kanagawa-ken, Japan; Yutaka Nakamura, 1001 Yukigaya-cho, Ota-ku, Tokyo, Japan; and Tomio Nagashima, 14, 3-chome, Nishimizue, Edogawa-ku, Tokyo, Japan Filed Feb. 8, 1963, Ser. No. 257,210
1 Claim. (Cl. 148—108)

The present invention relates to a process of production of magnetic materials with the constancy of permeability by the utilization of a magnetic annealing effect, wherein a ferromagnetic metallic tape wound to form a toroid is annealed in a magnetic field applied perpendicularly to the longitudinal direction of the tape and further, wherein a small air gap, which induces a weak demagnetizing field in the longitudinal direction of the tape, is provided in the magnetic path of the toroidal core, and also the temperature and time of the heat treatment for the tape are adjusted such as to have almost zero crystal magnetic anisotropy of cubic symmetry and at the same time to induce uniaxial anisotropy perpendicularly to the longitudinal direction of the tape.

This is a continuation-in-part application of the copending application Serial No. 13,550, filed March 8, 1960, now abandoned.

It is the main object of the present invention to provide a process of production of magnetic materials, which have the property of constancy of permeability to a relatively high magnetic field strength in the longitudinal direction of the tape, which also have a very small hysteresis loss and which further have only a slight change in the value of the permeability to a relatively high frequency.

Heretofore, as materials with the constancy of permeability, there are known "Perminvar" (Bell Telephone Lab.) utilized with "Perminvar" characteristics, "Isoperm" (Allgemeine Elektrizitäts Gesellschaft) utilized with a rolling magnetic anisotropy and magnetic powders compressed with a binder. However, the initial permeability of "Perminvar" remains constant at about $\mu_a=400$ up to an order of 4 Oe., but it has the disadvantage that when a large magnetic field is applied thereto, the constancy of permeability will be nearly lost. The permeability of the "Isoperm" is low (about 100) and the hysteresis loss is high. Further, the material utilized with the magnetic powder can only be produced to have the permeability of an order of 100–300.

It is another object of the present invention to provide a process of production of magnetic materials, wherein the magnetic materials have the permeability of about 1200–1500 and the frequency dependence of permeability is almost constant to about 50 kc., and also even after applying a large magnetic field enough to saturate the magnetic flux density, the property of the constancy of permeability remains. The magnetic instability $$S=\frac{\mu_a-\mu_r}{\mu_a}$$

is only to be of the order of 0.1–0.6%, wherein $\mu_a$ is the initial permeability and $\mu_r$ is the reversible permeability at the point of residual magnetization.

In case of cooling a magnetic material from a high temperature in a magnetic field, when the material exhibits magnetic annealing, it is well known that the direction of the magnetization vector in each magnetic domain is fixed at the same direction, as that of a magnetic field applied at a high temperature.

When the material is treated by heat in a magnetic field, theoretically the magnetization process in the direction perpendicularly to the field applied during the heat treatment consists of a rotation of the magnetization vector, and consequently when the hysteresis curves are drawn, the magnetic flux density B is increased linearly together with the increase of the magnetic field H, so as to show the constancy of permeability. Also, it is expected that the hysteresis loss and frequency characteristics are considerably improved. However, in a ferromagnetic alloy, the crystal anisotropy of cubic symmetry is usually superior over or of the same order as the uniaxial anisotropy constant induced by cooling from a high temperature in the magnetic field, and consequently the constancy of permeability is harmed. Accordingly, materials in which the crystal anisotropy constant is originally small in comparison with the uniaxial anisotropy constant or materials realized of such property by a heat-treatment are suitable for this purpose. In order to obtain high permeability, the uniaxial anisotropy constant is preferably small in the limitation permissible, however, in case no demagnetizing field in the direction of magnetization is available, but a demagnetizing field in the vertical direction is present, it is difficult to fix completely the magnetization vector in the vertical direction, and this is apparent from the relation between a dimensional ratio of the rod specimen and the uniaxial anisotropy constant as shown in Table 1.

TABLE 1

| | long axis / short axis | 1000 | 250 | 150 |
|---|---|---|---|---|
| 60% Ni-40% Fe | $K_u$ | $1.9\times10^3$ | $4.0\times10^3$ | $4.8\times10^3$ |
| 65% Ni-35% Fe | $K_u$ | ---------- | $3.2\times10^3$ | $3.7\times10^3$ |

The above Table 1 shows values obtained from the difference of the magnetization curves when polycrystal rod specimens of 60% Ni–40% Fe and 65% Ni–35% Fe, respectively, are cooled from 550° C. to 250° C. at the cooling rate of 10° C./hr. in a magnetic field disposed parallelly to the rod axis or in a circular magnetic field disposed perpendicularly to the rod axis. Further, a dimensional ratio in the Table 1 discloses the length of the long axis in relation to the length of the short axis, and $K_u$ shows the uniaxial anisotropy constant in ergs/cm.$^3$. Magnitudes of the uniaxial anisotropy constant are the aim of the magnetic annealing effect. Accordingly, from the result of the Table 1, in case of winding a tape in form of a toroid, a suitable demagnetizing field in the direction of magnetization can be achieved to obtain the same characteristic as rod specimens and also this demagnetizing field can be made by providing a suitable air gap in the magnetic circuit.

Now, the process of production of magnetic materials according to the present invention will be described more definitely with reference to working Examples 1 to 3.

*Example 1*

A binary alloy composed of the composition of 60% Ni and 40% Fe is worked into a tape having a thickness of 0.03 mm. by cold rolling, and this alloy tape is wound in the form of a toroid, while insulating with magnesia powder of 500 mesh per/cm.$^2$ between the layers of the tape and a demagnetizing field is arranged by providing an air gap of about 0.05 mm. in the magnetic circuit, which is brought about by cutting out a thin portion across the toroid. Then, the wound tape is annealed in an atmosphere of dry hydrogen at about 1200° C. for 3 hours, so as to raise the purity of the material and to remove the mechanical stress. Then, the tape of toroid form is clamped from both sides thereof by cylindrical yokes of pure iron, so as not to produce any distortion, and consequently a demagnetizing field in the axial direction of the toroid is obtained, and while applying a magnetic field of about 30 Oe. in the axial direction of the wound tape from the outside, the wound tape is slowly cooled at the cooling rate of 5° C./hr. in an atmosphere of dry hydrogen from 500° C. to 270° C.

*Example 2*

A ternary alloy composed of the composition of 60% Ni, 40% Fe and an addition of 1% Mn is worked by cold rolling, so as to produce a tape having a thickness of 0.02 mm. and this tape is cut to obtain a length of about 10 cm. and is wound to form a toroid, while insulating with magnesia powder 500 mesh per/cm.$^2$ between the layers of the tape. Then, firstly the wound tape is annealed in the atmosphere of dry hydrogen at about 1000° C. for 5 hours, so as to raise the purity of the wound tape and to remove the mechanical stress. Thereafter, ten of the toroidal tapes are juxtaposed, so as to obtain a demagnetizing field in the axial direction thereof, and while applying a magnetic field of about 30 Oe. to the sample from the outside, the sample is slowly cooled at a cooling rate of 10° C./hr. in an atmosphere of dry hydrogen from 550° C. to 280° C.

*Example 3*

A ternary alloy composed of the composition of 65% Ni, 35% Fe and an addition of 0.5% Mn is worked to produce a tape of a thickness of 0.05 mm., and after this tape is wound to form a toroid, an air gap of about 0.05 mm. is formed in the magnetic circuit, which is brought about by cutting a thin layer across the wound tape. Then, firstly the wound tape is annealed at 1100° C. for 3 hours in an atmosphere of dry hydrogen so as to raise the purity of the tape and to remove any mechanical stress. Thereafter, while applying a magnetic field of about 20 Oe. in the same procedure as that in the working Example 1, the tape is slowly cooled at a cooling rate of 40° C./hr. in the atmosphere of dry hydrogen from 500° C. to 250° C.

Table 2 discloses now the magnetic characteristics together with the conditions of the heat treatment in the Examples 1 to 3.

TABLE 2

| Working example | 1 | 2 | 3 |
|---|---|---|---|
| Composition (% by weight): | | | |
| Fe | 40 | 40 | 35. |
| Ni | 60 | 60 | 65. |
| Mn | | 1 | 0.5. |
| Thickness (mm.) | 3/100 | 2/100 | 5/100. |
| Condition of demagnetizing field | air gap | Wound the tape of length of 10 cm. | air gap. |
| Stress removing high temperature treatment: | | | |
| Temperature (° C.) | 1,200 | 1,000 | 1,100. |
| Time (hr.) | 3 | 5 | 4. |
| Magnetic annealing condition: | | | |
| Magnetic field | Perpendicular magnetic field 30 Oe. cylindrical yoke. | Perpendicular magnetic field 30 Oe., 10 of samples are laid in parallel. | Perpendicular magnetic field 20 Oe. cylindrical yoke. |
| Temperature range applied field (° C.) | 500–270 | 550–280 | 600–250. |
| Cooling rate ° C./hr | 5° C./hr | 10° C./hr | 40° C./hr. |
| Permeability ($\mu$): | | | |
| Static character | 1,220 (to 4.2 Oe.) | 1,500 (to 3.8 Oe.) | 1,120 (to 4.5 Oe.) |
| 10 kc. (0.8 Oe.) Amplitude | 1,170 | 1,460 | 1,060. |
| 30 kc. (0.8 Oe.) Amplitude | 980 | 1,270 | 850. |
| Hysteresis loss erg/cm.$^3$/cycle ($Bm$=5,000 gauss) | 140 | 240 | 180. |
| Coersive force (Oe.) | 0.06 | 0.1 | 0.05. |
| Residual flux density (gauss) | 120 | 200 | 150. |
| Instability (percent) | 0.1 | 0.6 | 0.3. |

With the above stated and other objects in view, which will become apparent in the following detailed description, the present invention will be clearly understood in connection with the accompanying drawings, in which.

Figure 1:
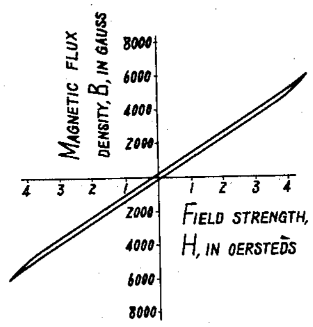
FIGS. 1, 2 and 3 are, respectively, hysterisis curves, frequency characteristics and magnetic field strength permeability curves.

Referring now to the drawings, and in particular to FIG. 1, in this figure the ordinate indicates the magnetic flux density B and the abscissa indicates the strength H (Oe.) of the magnetic field.

Figure 2:
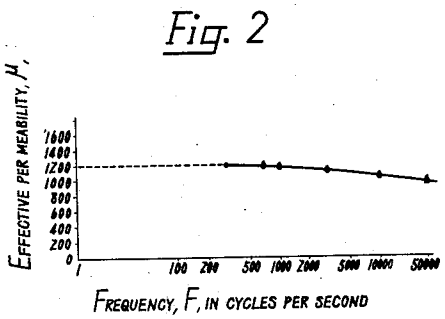

In FIG. 2 the ordinate indicates the permeability $\mu$ and the abscissa indicates the frequency in cycles, s./sec., and the mark indicates $\mu$ for an amplitude of 0.45 Oe., and the mark indicates a permeability $\mu$ and the abscissa indicates the strength H (Oe.) of a magnetic field.

Figure 3:
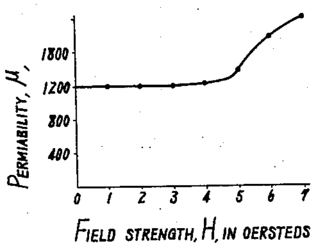

The values of the permeability obtained by the present invention, as apparent from FIGS 1 to 3 and the Table 2, are attained at a value of 1200–1500 up to an order of 4–4.5 Oe. and also the frequency characteristic shows only a slight reduction of permeability up to an order of about 50 kc., and this fact shows that it is usable as a material with the constancy of permeability to the range of frequency of an order of 50 kc. Further, the smallness of hysteresis loss is a part of an advantageous condition for using it at an audible frequency, for instance, a hysteresis loss for the present material in 5000 gauss of magnetic flux density is 140–240 ergs/cm.$^3$, however, this is only a value of 1/6–1/10 of the loss encountered in the use of Perminvar.

The basis of the selection of the composition, temperature and time of heat treatment will now be more clearly set forth:

In connection with "Permalloy" (Fe–Ni) it is known, that a crystal magnetic anisotropy of cubic symmetry is changed with the formation of a superlattice structure. Further, a degree of the order in "Permalloy" is considerably effected by the cooling rate in a temperature range of about 600° C. to 300° C.

Figure 4:
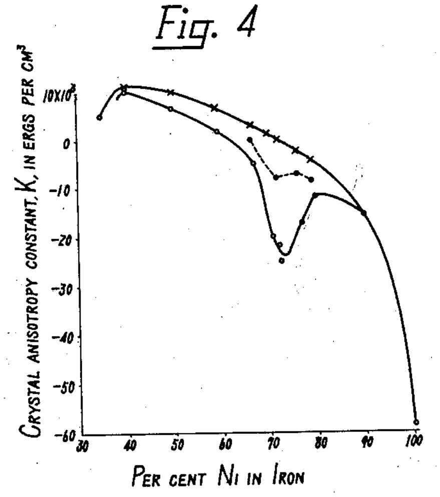
FIG. 4 is a curve depicting the crystal anisotropy constant with the percentage of nickel in iron.

FIG. 4 discloses values measured by a torque meter at room temperature a crystal anisotropy constant K of cubic symmetry, respectively, when the alloys with various compositions are cooled at the cooling rate of 105° C./hr., 55° C./hr., and 25° C./hr. in a temperature range of 600° C. (see R. M. Bozorth and J. G. Walker; Phys. Rev. 89 (1953), 624). In FIG. 4, the ordinate depicts an anistropy constant in ergs/cm.$^3$ and the abscissa depicts the content of Ni by wt. percent. The values upon adopting 105° C./hr., are shown by full lines with an "X," the values upon adopting 55° C./hr. are shown by dotted lines, and the values, upon adopting 25° C./hr., are shown by full lines with an "O." As seen from the drawings, the composition of the crystal anisotropy K going down to zero is about 75% Ni upon adopting the cooling rate of 105° C./hr., 67% Ni upon adopting 55° C./hr., and 63% Ni upon adopting 25° C./hr. Accordingly, it is seen that the composition of the substance, in which crystal anisotropy moves to zero, together with the cooling rate is lowered, is shifted toward the smaller Ni content.

Figure 5:
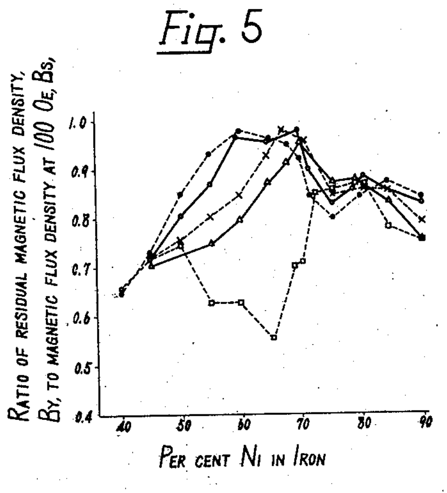
FIG. 5 is a curve depicting the ratio of residual magnetic flux density with the percentage of nickel in iron.

FIG. 5 shows values at the room temperature of the ratio of a residual flux density B*r* to a magnetic flux density B*s* at 100 Oe. measured after polycrystal rod specimens (0.5 mm. diameter and 150 cm. length) of "Permalloy" of various compositions are treated at the cooling rates of 3×10Δ° C./hr. indicated in the drawing by "Δ," 600° C./hr. by 100° C./hr. by an "X," 10° C./hr. by an "O," and 1° C./hr. by a period between 600° C. to 250° C. in a magnetic field of about 20 Oe. *Br/Bs* is a quantity sensible to crystal anisotropy of cubic symmetry and uniaxial anisotropy induced by the cooling in the magnetic field. Generally, the smaller the crystal anisotropy and also the larger uniaxial anisotropy, the larger gets *Br/Bs*. From the drawings, it can be determined that in a range of 50%–70% of Ni content, this quantity is considerably varied with the cooling rates, and in order to increase the value of *Br/Bs*, it has been found that the smaller the content of Ni which is adopted, the smaller is the cooling rate necesary to be used.

On the other hand, the uniaxial anisotropy constant $K_u$ also varies with the cooling rate, and generally it is larger when the cooling rate is lowered, however, it is known that when a degree of a long range order of superlattice is developed above some degree, the uniaxial anisotropy is decreased inversely.

Figure 6:
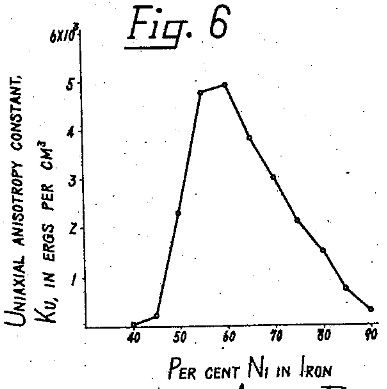
FIG. 6 is a curve depicting the uniaxial anisotropy constant with the percentage of nickel in iron.

FIG. 6 discloses the result concerning the difference in the uniaxial anisotropy constant $K_u$ in accordance with the compositions of the "Permalloys." The value of $K_u$ is obtained from the difference of the curves of magnetization, when the polycrystal rod is cooled at a cooling rate of 10° C./hr. from 550° C. to 250° C. in the magnetic field parallel to the rod axis and in the circular magnetic field perpendicular to the rod axis. It can be easily determined from the drawing that the composition of about 60% Ni has the largest value.

From the above result, in the range of the composition containing about 50–70% Ni, the uniaxial anisotropy $K_u$ is relatively large and also the crystal anisotropy constant can be made to zero or to a considerably small value by slowly cooling at a cooling rate of 100° C./hr. or at below the rate thereof. Further, *Br/Bs* aims to make $K_u$ larger and K smaller. However, this ratio, in the range of 50%–70% Ni, can be made larger by cooling it slowly at the rate of 100° C./hr. or at slower rate.

It has already been described that by the use of a suitable heat treatment and time, crystal anisotropy constant must be made to zero or to a considerably small value, and also the uniaxial anisotropy constant is necessary to be made preferably of a larger value. This condition, as above described, can be provided by a process according to which a tape of an alloy composed of a material of 30%–50% Fe by weight and 70%–50% Ni by weight is slowly cooled in a magnetic field at the rate of 100° C./hr. or at a smaller rate within a range of 600° C.–200° C.

Figure 7:
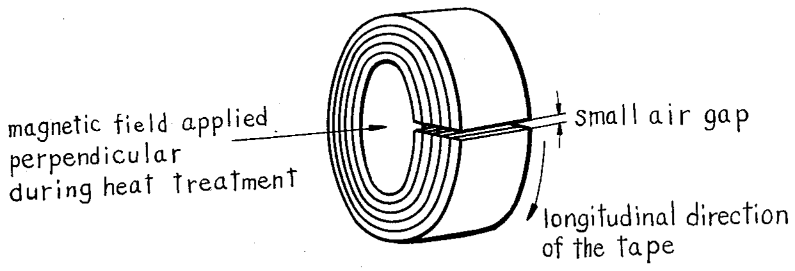
FIG. 7 is a perspective view of a wound tape indicating the air gap.

Referring now to FIG. 7 of the drawings, the formation of the air gap is disclosed, which is provided to induce a weak demagnetizing field in the longitudinal direction of the tape. It should be emphasized that the air gap is disposed perpendicularly to the winding direction of the toroid.

Figure 8:
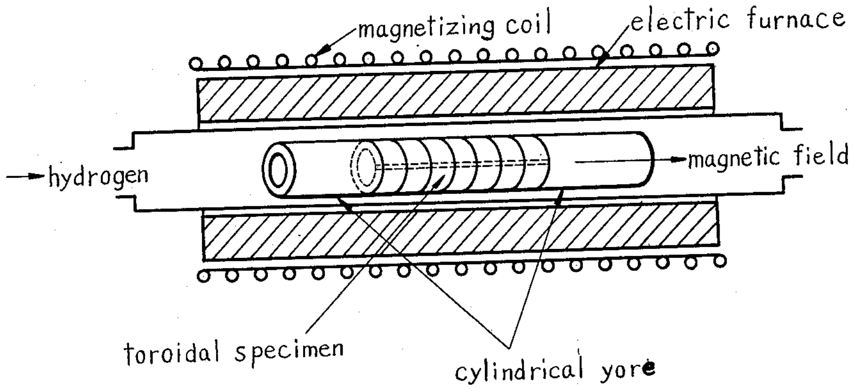
FIG. 8 is a schematic axial section of an electric furnace.

As clearly disclosed in FIG. 8 of the drawings, a wound tape is clamped between the ends of a cylindrical yoke and heated in an electrical furnace by providing a vertical magnetic field in order to obtain the desired characteristic.

As pointed out in the Table 1, the values of uniaxial anisotropy are constant, when the length ratio is varied. The demagnetizing factor in the toroidal core is preferably about 0.003.

Figure 9:
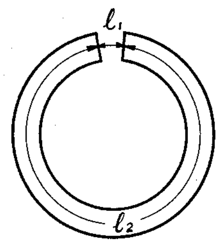
FIG. 9 is an end view of a wound tape disclosing the relationship between the length of the tape and the air gap.

As indicated in FIG. 9 of the drawings, the demagnetizing factor N is obtained by means of the length of the air gap, whereby $l$ is an average length of the magnetic path in the toroidal core, as expressed in the formula $$N=4\pi\frac{l_1}{l}$$

in which, for instance, $l$=6 cm. and the air gap is obtained from the formula, namely $l$=0.03 cm.

In this maner, the values can be determined and it has been set forth above that the air gap can be 0.05 cm.

As above described, a tape of "Permalloy" (Fe–Ni) of a suitable composition and wound to form a toroid is applied in a magnetic field perpendicular to the longitudinal direction of the tape and is heat treated, and further by applying a weak demagnetizing field in the longitudinal direction of the tape and by selecting suitably the temperature and time for the heat treatment of the tape, materials with the constancy of permeability having very superior characteristics, in comparison with the known various materials with the constancy of permeability can be produced by the present invention.

While we have disclosed several embodiments of the present invention, it is to be understood that these embodiments are given by example only and not in a limiting sense, the scope of the present invention being determined by the objects and the claim.

We claim:

A process of the production of a magnetic material having a constancy of permeability by the utilization of a magnetic annealing effect, comprising the steps of working an alloy composed of 30 to 50% Fe by weight, 70 to 50% Ni by weight, and 0 to 1% Mn by weight to a ferromagnetic tape wound to form a toroid and defining a plurality of layers, applying magnesia powder of 500 mesh per/cm.$^2$ between each pair of adjacent layers of said tape and defining an air gap of about 0.05 mm. across said wound tape in the magnetic path of said tape, annealing said tape in an atmosphere of dry hydrogen at about 1000° C. to about 1200° C. for a time period of about 3 to 5 hours, applying a magnetic field of up to about 30 Oe. in axial direction of said wound tape, and cooling said wound tape at a cooling rate of no more than 100° C./hr. between a temperature range of about 600° C. to 200° C. in a magnetic field disposed perpendicularly to the direction of magnetizing, whereby the crystal anisotropy constancy of the cubic symmetry is considerably reduced and the uniaxial anisotropy perpendicularly to the longitudinal direction of said wound tape is induced simultaneously.

No references cited.